(12) United States Patent
Matrangolo

(10) Patent No.: US 9,781,877 B2
(45) Date of Patent: Oct. 10, 2017

(54) METERING DEVICE FOR METERING BULK MATERIAL

(71) Applicant: Kverneland AS, Kvernaland (NO)

(72) Inventor: Enrico Matrangolo, Soest (DE)

(73) Assignee: Kverneland AS, Kvernaland (NO)

( * ) Notice: Subject to any disclaimer, the term of this patent is extended or adjusted under 35 U.S.C. 154(b) by 0 days.

(21) Appl. No.: 14/916,352

(22) PCT Filed: Jul. 25, 2014

(86) PCT No.: PCT/EP2014/066076
§ 371 (c)(1),
(2) Date: Mar. 3, 2016

(87) PCT Pub. No.: WO2015/055330
PCT Pub. Date: Apr. 23, 2015

(65) Prior Publication Data
US 2016/0198624 A1    Jul. 14, 2016

(30) Foreign Application Priority Data

Oct. 16, 2013    (EP) ..................................... 13188881

(51) Int. Cl.
*A01C 15/00* (2006.01)
*A01C 7/20* (2006.01)
*A01C 7/08* (2006.01)
*A01C 7/12* (2006.01)

(52) U.S. Cl.
CPC ................ *A01C 7/20* (2013.01); *A01C 7/127* (2013.01); *A01C 15/005* (2013.01); *A01C 7/081* (2013.01)

(58) Field of Classification Search
CPC ........ A01C 15/005; A01C 15/04; A01C 15/00; A01C 7/20; A01C 7/00; A01C 7/081; A01C 7/08; A01C 7/127; A01C 7/12
See application file for complete search history.

(56) References Cited

U.S. PATENT DOCUMENTS 4,514,114 A    4/1985 Fuss et al. ...................... 406/65

FOREIGN PATENT DOCUMENTS

| DE | 202004004381 | 6/2004 | ............ A01C 15/04 |
| DE | 102007044178 | 4/2008 | .............. A01C 7/08 |
| DE | 10 2008 038 538 A1 | 2/2010 | ............ A01C 15/04 |
| DE | 102008038538 | 2/2010 | ............ A01C 15/04 |
| EP | 2 260 689 | 12/2010 | .............. A01C 7/08 |
| EP | 2 353 356 | 8/2011 | .............. A01C 7/00 |

OTHER PUBLICATIONS

International Search Report from corresponding International Patent Application No. PCT/EP2014/066076, dated Aug. 28, 2014 (English-language translation provided).

*Primary Examiner* — Christopher J Novosad
(74) *Attorney, Agent, or Firm* — Kusner & Jaffe

(57) ABSTRACT

A metering device and a distributing machine for metering free-flowing bulk material, in particular seeds and/or fertilizer, from a container, using a metering device. The metering device includes a delivery channel with an inlet and a metering outlet, and a pressure compensation section disposed in the delivery channel between the inlet and the metering outlet. The pressure compensation section is actuated by a pressure difference between the delivery channel and the surroundings.

14 Claims, 7 Drawing Sheets

METERING DEVICE FOR METERING BULK MATERIAL

FIELD OF INVENTION

The present invention relates to a metering device for metering free-flowing bulk material, in particular seeds and/or fertiliser, from a container as well as a distributing machine for outputting free-flowing bulk material, in particular seeds and/or fertiliser, with a metering device.

BACKGROUND OF INVENTION

Metering devices are used in agricultural machines in order to meter seeds and/or fertiliser in a precise manner and then to output the same onto agricultural areas, as described for example in EP 0 094 583.

DE 20 2004 004 381 U1 shows a metering device with a delivery channel constituted pressure-tight, wherein a connecting line for pressure compensation between the delivery channel and a storage container is disposed between the storage container and the delivery channel. According to paragraph [0007] of DE 20 2004 004 381 U1, this requires a pressure-tight embodiment of the storage container, which makes the design of the storage container expensive.

The problem of the present invention, therefore, is to provide a metering device with which the function of the metering device is optimised, in particular with regard to the maximum possible delivery flow as well as in the case of switching off the metering device, in particular the delivery wheel, for stopping the seed supply, with simultaneous operation of the pneumatic blower for generating the delivery flow in a delivery line.

SUMMARY OF INVENTION

This problem is solved with the features of the independent claim(s). Advantageous developments of the invention are stated in the sub-claims. All combinations comprising at least two of the features stated in the description, the claims and/or the figures also fall within the scope of the invention. With the stated value ranges, values lying inside the stated limits are also intended to be disclosed as limiting values and capable of being claimed in any combination.

The idea underlying the invention is to dispose in the delivery channel a pressure compensation means which is actuated by a pressure difference between the delivery channel and the surroundings, in particular between an opened and closed position.

In other words, any pressure difference between the delivery channel and the surroundings is automatically removed by design measures, in particular exclusively dependent on the level of the pressure difference, without a measurement and control and/or regulation being required for the pressure compensation.

According to the invention, the metering device is further developed by the fact that the pressure compensation means comprises at least one pressure compensation opening provided with a membrane. The opening behaviour of a membrane can be advantageously adjusted exactly, in particular by a suitable selection of material and/or its thickness and area and/or the shape and/or dimensions of the membrane. The membrane is particularly durable due to the selection of the membrane material adapted to the operating conditions. Moreover, the opening cross-section of a membrane is larger compared to any valve solution, so that a direct and improved pressure compensation is possible.

According to a further, advantageous embodiment of the invention, provision is made such that the pressure compensation means are actuated by a pressure difference, in particular by an underpressure in the delivery channel, of at least 1 mbar, in particular at least 5 mbar, preferably at least 10 mbar, still more preferably at least 15 mbar.

According to the present invention, the metering device can be designed in a particularly straightforward manner, in that the pressure compensation means are constituted so as to act passively. In other words, the pressure compensation means are designed to operate automatically and are triggered by a specific pressure difference present in the delivery channel compared to the surroundings.

According to a further advantageous embodiment, provision is made such that the pressure compensation means are closed with a pressure difference of less than 15 mbar, in particular less than 10 mbar, preferably less than 5 mbar, still more preferably less than 1 mbar. Closed means that no pressure compensation takes place between the delivery channel and the surroundings, wherein the pressure compensation means are constituted in a sealing manner, in particular the delivery channel with respect to the surroundings.

According to a further aspect of the present invention, a flap mechanism for deflecting the free-flowing bulk material, in particular seeds and/or fertiliser, to a calibration test (tapping) sample opening is disposed in the delivery channel between the inlet and the pressure compensation means, said flap mechanism being able to be actuated from outside the delivery channel and especially being arranged airtight with respect to the pressure compensation means.

As an independent invention, a distributing machine for outputting free-flowing bulk material, in particular seeds and/or fertiliser, is disclosed with a metering device as described above, wherein all the features of the metering device also apply to the distributing machine.

A method with method features disclosed in the present description is also disclosed as an independent invention, wherein any method features are also intended to be disclosed as device features and vice versa.

Further advantages, features and details of the invention emerge from the following description of preferred examples of embodiment and with the aid of the drawings.

BRIEF DESCRIPTION OF DRAWINGS

The same components and components with the same function are denoted with the same reference numbers in the figures.

DETAILED DESCRIPTION OF INVENTION

Figure 1:
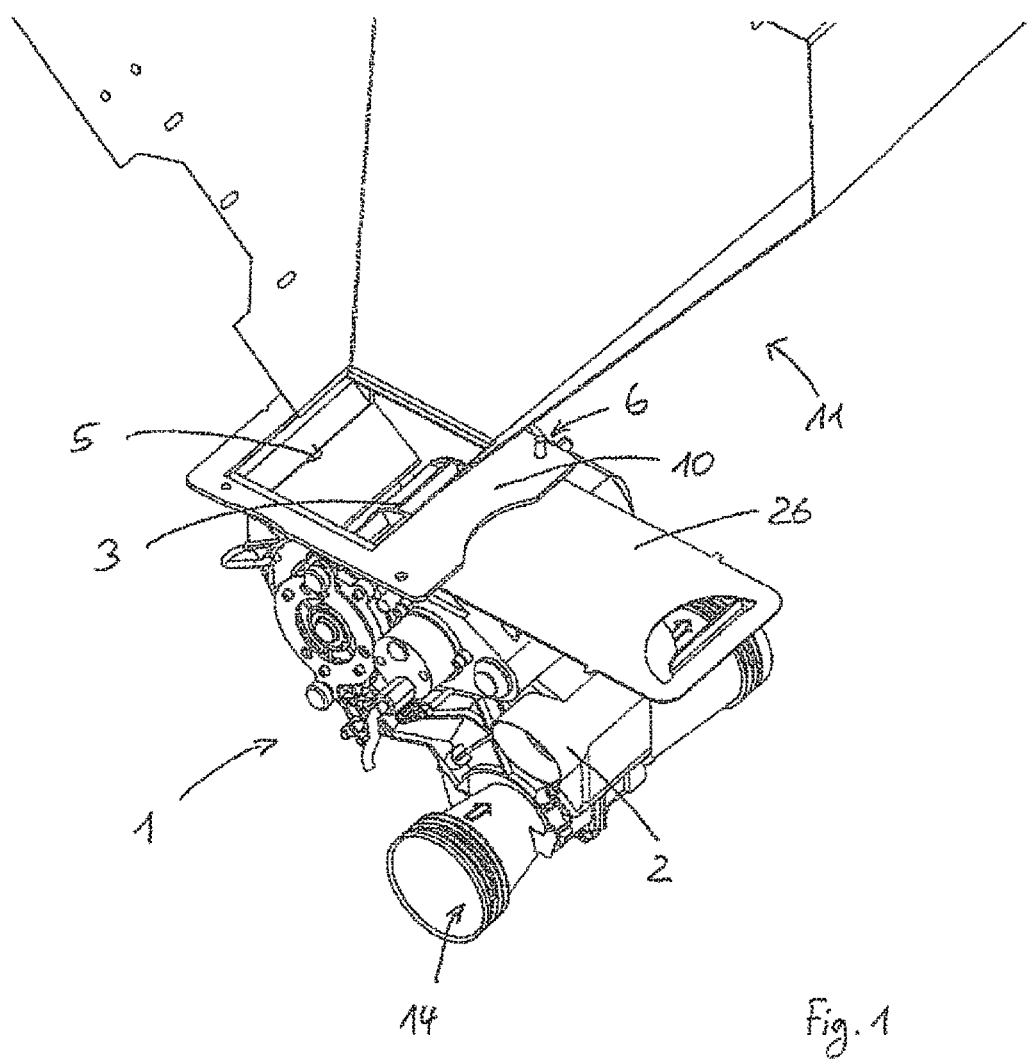
FIG. 1 shows a diagrammatic perspective view of a detail of a distributing machine according to the invention.
Figure 2:
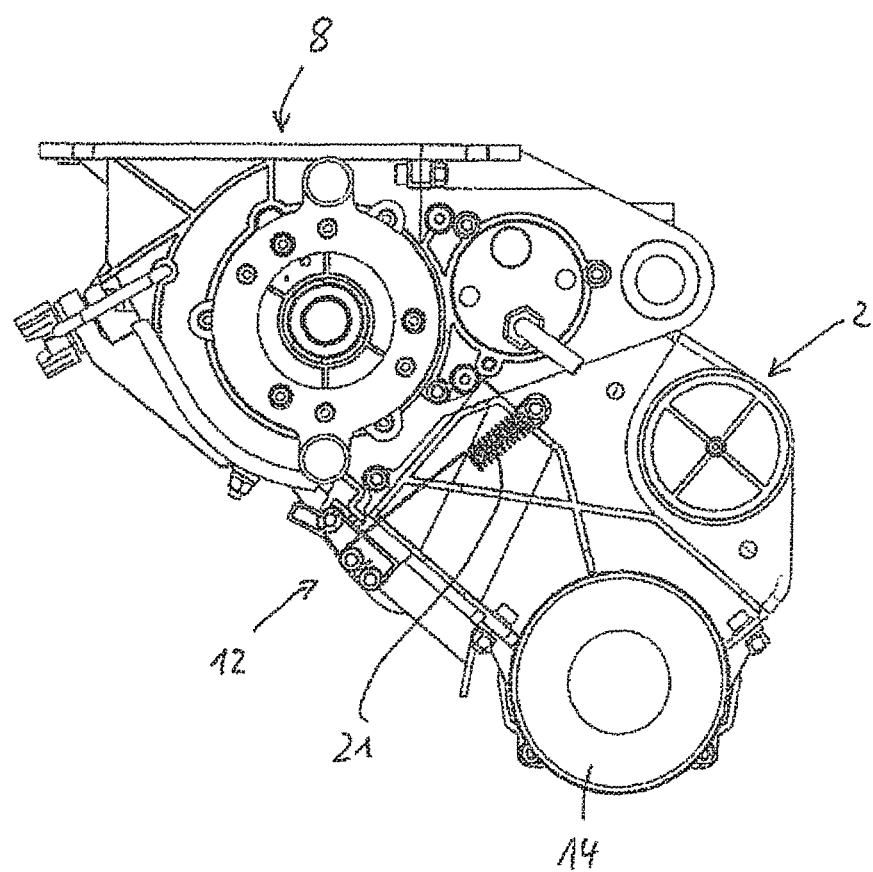
FIG. 2 shows a diagrammatic side view of a metering device according to the invention.
Figure 3:
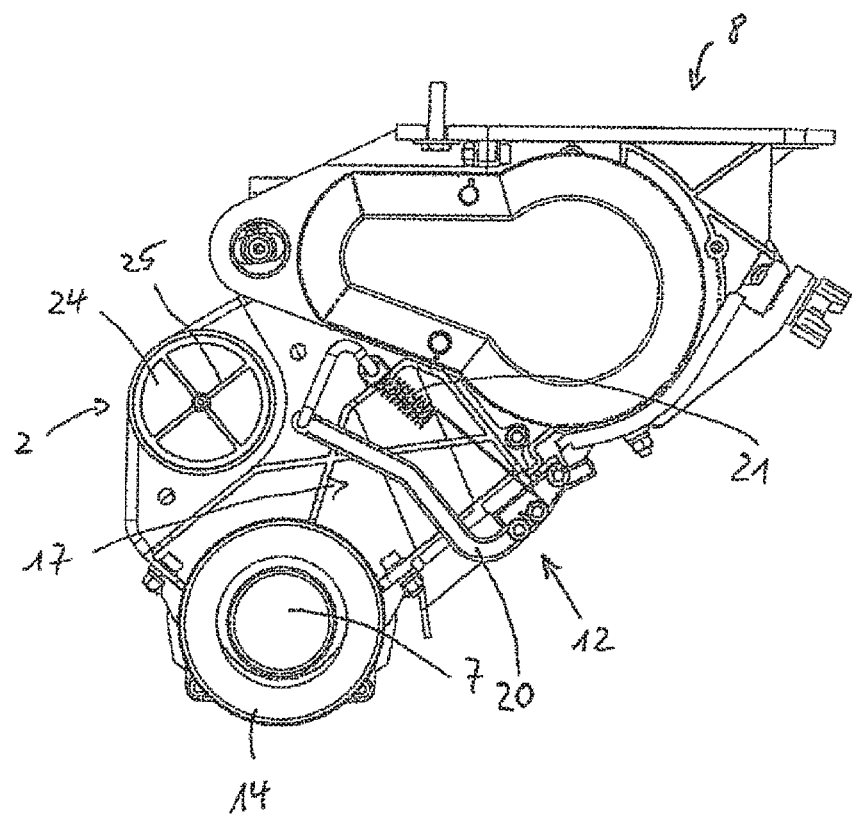
FIG. 3 shows a diagrammatic side view of the metering device according to FIG. 2 from the opposite side.
Figure 4:
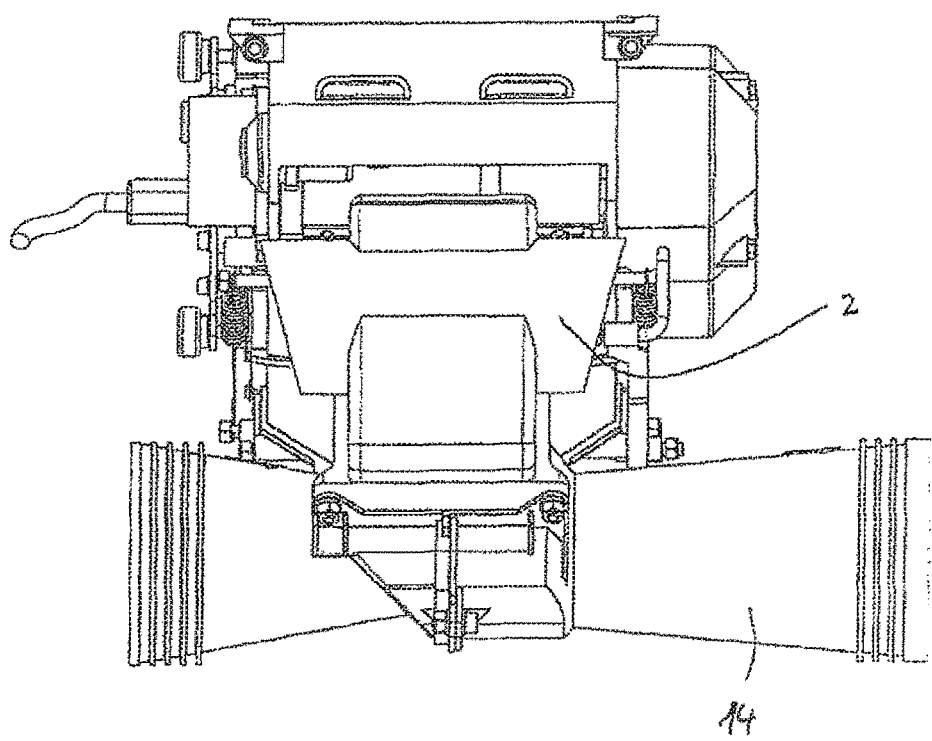
FIG. 4 shows a diagrammatic side view of the metering device from behind.

In FIG. 1, a container 11 for receiving free-flowing bulk material, in particular seeds or fertiliser, is indicated with a bottom 10, a metering device 1 being able to be fixed to its bottom by fixing means 6, in such a way that an inlet 8 of metering device 1 is disposed in the region of a bottom opening 5. Bottom opening 5 can be closed by a slide gate 4.

During the operation of metering device 1, bulk material is delivered from container 11 through a delivery channel 9 from inlet 8 to a metering outlet 7 disposed at the opposite end of delivery channel 9. The metering and delivery takes place by means of a delivery wheel 3 projecting at least partially into delivery channel 9. Metering outlet 7 emerges into a pneumatically operated delivery line 14, from where the bulk material is distributed by means of a distributor (not represented in detail) to corresponding seeding coulters of the distributing machine.

In the flow direction of the bulk material running from container 11 along delivery channel 9, metering device 1 comprises in particular one or more of the following sections, in particular in this order:

1. an inlet section, which is connected to container 11 and in particular comprises inlet 8, which in particular emerges directly into delivery wheel 3;
2. a delivery wheel section, which comprises delivery wheel 3 and in which delivery channel 9 is at least partially constituted, in such a way that a rotational outer contour of delivery wheel 3 runs along delivery channel 9;
3. a calibration test section for taking a calibration test sample, in particular with a flap mechanism 12 according to the invention, by means of which delivery channel 9 comprises at least two different delivery paths;
4. a pressure compensation section with pressure compensation means 2 according to the invention and
5. a delivery line section, at which delivery line 14 can be disposed, in particular fixed, in particular in a sealing manner.

Figure 6:
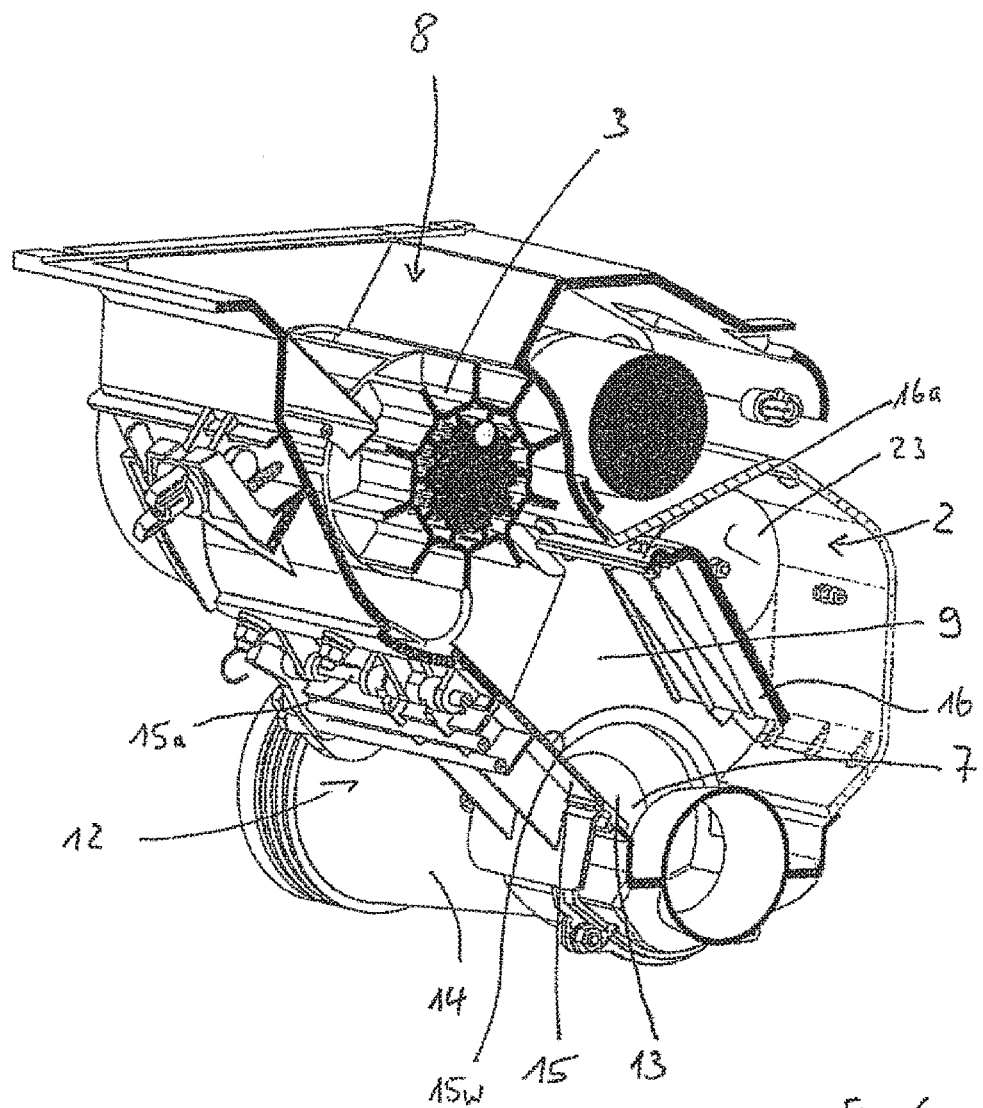
FIG. 6 shows a diagrammatic perspective view of the metering device in a closed operating position of a flap mechanism.
Figure 7:
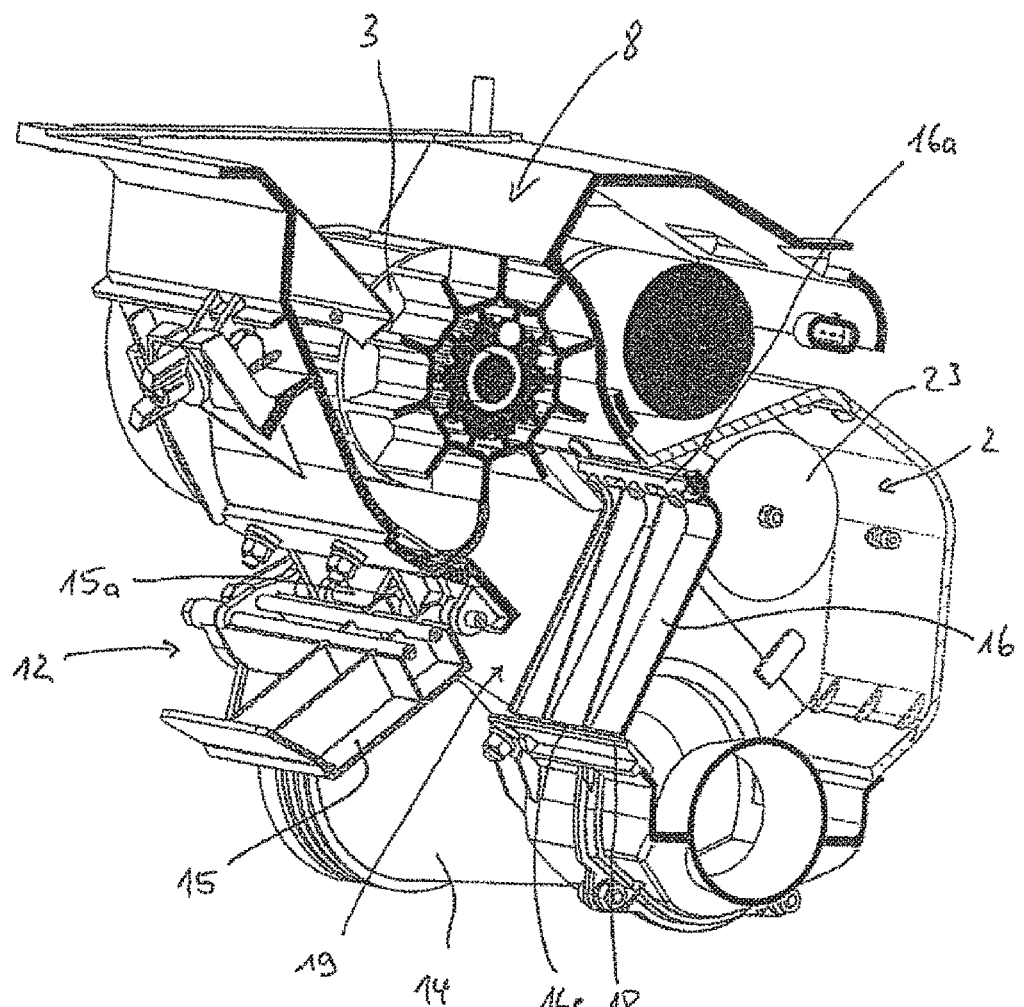
FIG. 7 shows a diagrammatic perspective view of the metering device in an opened operating position of the flap mechanism.

The operation of metering device 1 during the outputting of free-flowing bulk material, in particular seeds and/or fertiliser, is best seen and described in FIG. 6. The task of metering wheel 3 is to bring a specific quantity of bulk material from container 11 to delivery line 14, wherein the delivery quantity is determined by the rotational speed of delivery wheel 3 and its geometrical dimensions, in particular delivery cams disposed at the circumference. The delivery flow can thus be controlled, in particular exclusively, by the rotational speed of delivery wheel 3. No bulk material is delivered when delivery wheel 3 is stationary. In addition, a slide gate 26 can be provided to close bottom opening 5.

As soon as the bulk material arrives at metering outlet 7, it is taken up by the air flow of pneumatically operated delivery line 14 and transported onwards. In particular, delivery line 14 is disposed at right angles to delivery channel 9 at metering outlet 7.

The pressure ratios in the calibration test section and in the pressure compensation section are influenced by the pneumatic operation on the one hand and the continuous supply of bulk material on the other hand, since the two aforementioned sections are preferably arranged airtight with respect to the surroundings, particularly in a delivery position of flap mechanism 12 (FIG. 6).

Flap mechanism 12 comprises an opening flap 15 for opening delivery channel 9, in order to remove a calibration test sample from the delivery flow or to deflect the delivery flow accordingly. A deflection flap 16 is provided for the purpose of the deflection, said deflection flap being operated in particular jointly with opening flap 15, preferably by means of a mechanical connecting element 17.

Opening flap 15 comprises a swivel axis 15a, around which opening flap 15 can be swivelled out of a closed position into an opened position. In the closed position according to FIG. 6, a wall section 15w of opening flap 15 forms a part of an inner wall of the delivery channel, in particular flush and/or aligned with delivery channel 9.

Deflection flap 16 also comprises a swivel axis 16a, around which deflection flap 16 can be swivelled out of a calibration test position into a delivery position. Deflection flap 16 is dimensioned such that, in the calibration test position, it lies, with its end 16e opposite swivel axis 16a, adjacent to a side edge 18 of calibration test sample opening 19 of delivery channel 9. Deflection flap 19 runs obliquely through delivery channel 9, in order that the bulk material for the calibration test sample is deflected to calibration test sample opening 19. In design terms, this is achieved by the fact that swivel axis 16a of deflection flap 16 is disposed closer to delivery wheel 3 than end 16e.

Flap mechanism 12 is implemented in particular by a toggle lever 20 as a mechanical connecting element 17, which can be operated, in particular mechanically, from outside metering device 1, in particular against a spring force brought about by a spring 21, a spring 21 connecting opening flap 15 and deflection flap 16.

Pressure compensation means 2 are fitted, in particular mechanically flange-mounted, in particular in an airtight manner, on metering device 1 by means of a housing element 22. Furthermore, there are provided on housing element 22 in particular two membranes 23, disposed lying mutually opposite, on membrane openings 24 of housing element 22. Membrane openings 24 are disposed in particular in parallel aligned with one another and/or parallel with delivery line 14. In an alternative embodiment, a single membrane 23, which is fitted to the housing element, can be sufficient.

Figure 5:
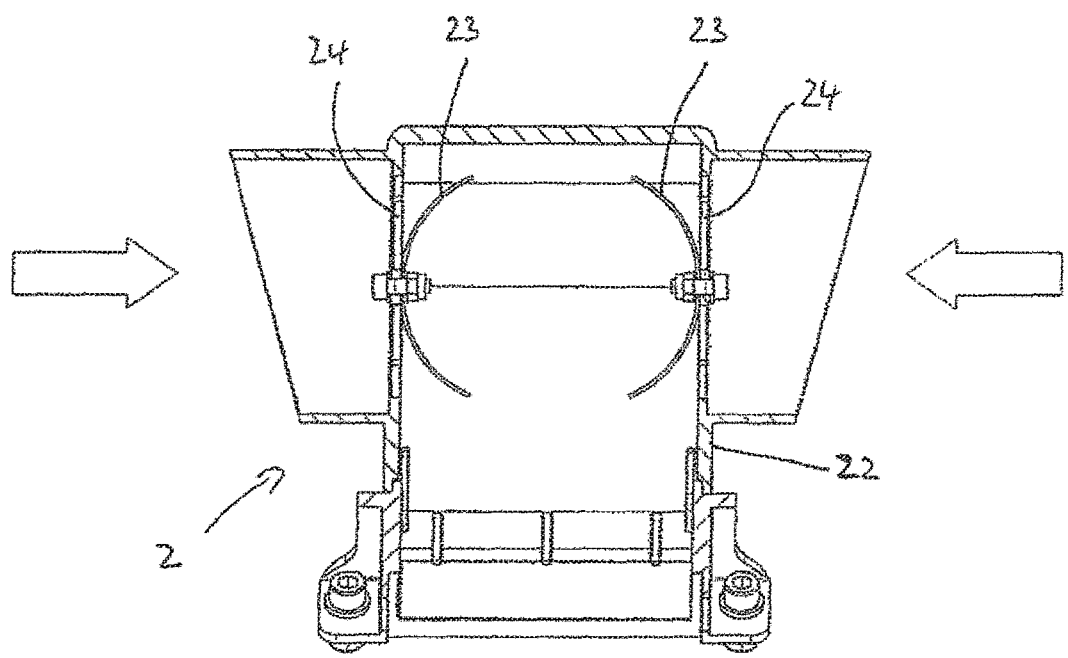
FIG. 5 shows a diagrammatic cross-sectional view of pressure compensation means of the metering device in the pressure compensation position.

Membranes 23 are fitted on struts 25, in particular concentrically with respect to respective membrane opening 24. Membranes 23 are made of a flexible material, in particular having an elastomer character, preferably an elastomer, such as rubber for example, alternatively of a thermoplastic elastomer. As a result of the shape of the membrane, which is preferably circular in cross-section, and the exclusively concentric fixing, membrane 23 is distorted inwards into the interior of housing element 22 in the presence of a pressure difference between delivery channel 9 and the surroundings. Pressure compensation can thus take place through membrane opening 24 (see arrows in FIG. 5). As soon as a pressure compensation has taken place, membranes 23 close membrane openings 24 automatically on account of the elasticity of membranes 23. According to the invention, pressure compensation means 2 are thus controlled automatically by the pressure ratios in delivery channel 9, in particular in the pressure compensation section.

The response behaviour of pressure compensation means 2 is fixed by the selection of the material and the material thickness of membranes 23 and the opening diameter of membrane openings 24, wherein the membrane is intended to open especially with an underpressure of approx. 10 mbar, which can for example be present in delivery channel 9 when an air flow is present on delivery line 14, but delivery wheel 3 is stationary. This may be the case, for example, if no bulk material is to be outputted at the headland. It can also occur if a calibration test sample is taken via flap mechanism 12, as a result of which an underpressure can arise in the pressure compensation section closed by deflection flap 16 on account of delivery line 14.

In other words, the invention in particular makes provision such that, after stopping of delivery wheel 3 (for example at the headland, where no bulk material is to be outputted), despite continuing operation of the air flow in delivery line 14, no underpressure is present at delivery wheel 3, since membrane(s) 23 automatically ensure a pressure compensation.

LIST OF REFERENCE NUMBERS

1 metering device
2 pressure compensation means
3 delivery wheel
4 slide gate
5 bottom opening
6 fixing means
7 metering outlet
8 inlet
9 delivery channel
10 bottom
11 container
12 flap mechanism
13 outlet
14 delivery line
15 opening flap
15*a* swivel axis
15*w* wall section
16 deflection flap
16*a* swivel axis
16*e* end
17 connecting element
18 side edge
19 calibration test sample opening
20 toggle lever
21 spring
22 housing element
23 membranes
24 membrane openings
25 struts
26 slide gate Having described the invention, the following claimed:

1. A metering device for metering bulk material from a container, the metering device comprising:
    a delivery channel having an inlet and a metering outlet, wherein the bulk material enters the delivery channel at the inlet and exits the delivery channel at the metering outlet; and
    pressure compensation means disposed in the delivery channel between the inlet and the metering outlet, wherein the pressure compensation means comprises a housing element having at least one opening provided with a membrane moveable between an open position and a closed position in response to an air pressure difference between the delivery channel and an environment surrounding the metering device, said membrane opens the opening in the open position and closes the opening in the closed position.

2. The metering device according to claim 1, wherein the membrane is made of a flexible material that distorts in response to the air pressure difference to effect pressure compensation.

3. The metering device according to claim 1, wherein the membrane moves to the open position in response to an underpressure condition, in the delivery channel, of at least 1 mbar.

4. The metering device according to claim 1, wherein the pressure compensation means acts passively.

5. The metering device according to claim 1, wherein the membrane moves to the closed position in response to a pressure difference between the delivery channel and the environment surrounding the metering device of less than 15 mbar.

6. The metering device according to claim 1, wherein the delivery channel is arranged airtight in a delivery operating position of the metering device.

7. The metering device according to claim 1, wherein the metering device further comprises:
    a flap mechanism for deflecting the bulk material to a calibration test sample opening, wherein the flap mechanism is disposed in the delivery channel between the inlet and the pressure compensation means, said flap mechanism actuated from outside the delivery channel and arranged airtight with respect to the pressure compensation means.

8. A distributing machine for outputting bulk material, wherein the distributing machine comprises:
    a metering device for metering the bulk material, the metering device including:
        a delivery channel having an inlet and a metering outlet, wherein the bulk material enters the delivery channel at the inlet and exits the delivery channel at the metering outlet; and
        pressure compensation means disposed in the delivery channel between the inlet and the metering outlet, wherein the pressure compensation means comprises a housing element having at least one opening provided with a membrane moveable between an open position and a closed position in response to an air pressure difference between the delivery channel and an environment surrounding the metering device, said membrane opens the opening in the open position and closes the opening in the closed position.

9. The distributing machine according to claim 8, wherein the membrane is made of a flexible material that distorts in response to the air pressure difference to effect pressure compensation.

10. The distributing machine according to claim 8, wherein the membrane moves to the open position in response to an underpressure condition, in the delivery channel, of at least 1 mbar.

11. The distributing machine according to claim 8, wherein the pressure compensation means acts passively.

12. The distributing machine according to claim 8, wherein the membrane moves to the closed position in response to a pressure difference between the delivery channel and the environment surrounding the metering device of less than 15 mbar.

13. The distributing machine according to claim 8, wherein the delivery channel is arranged airtight in a delivery operating position of the metering device.

14. The distributing machine according to claim 8, wherein the metering device further comprises:
    a flap mechanism for deflecting the bulk material to a calibration test sample opening, wherein the flap mechanism is disposed in the delivery channel between the inlet and the pressure compensation means, said flap mechanism actuated from outside the delivery channel and arranged airtight with respect to the pressure compensation means.

\* \* \* \* \*